Feb. 27, 1962 S. CACIAGLI 3,022,965
AIRCRAFT WING
Filed Nov. 24, 1958 2 Sheets-Sheet 1

INVENTOR
SERGIO CACIAGLI
BY Raymond W Cotton
ATTORNEY

Feb. 27, 1962     S. CACIAGLI     3,022,965
AIRCRAFT WING
Filed Nov. 24, 1958     2 Sheets-Sheet 2
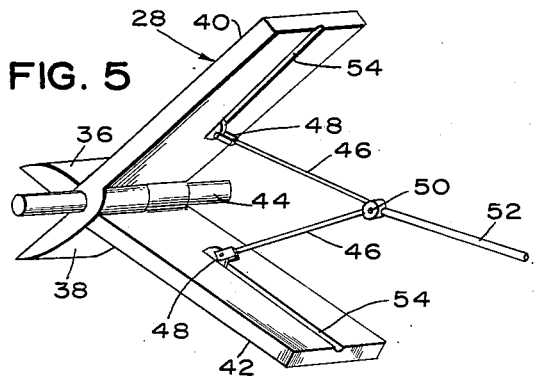
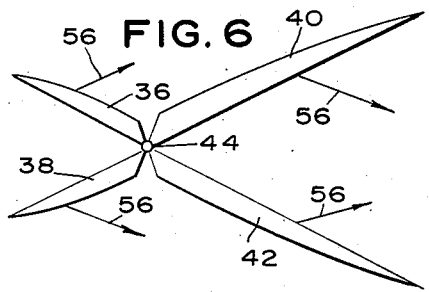
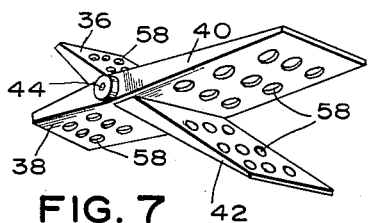
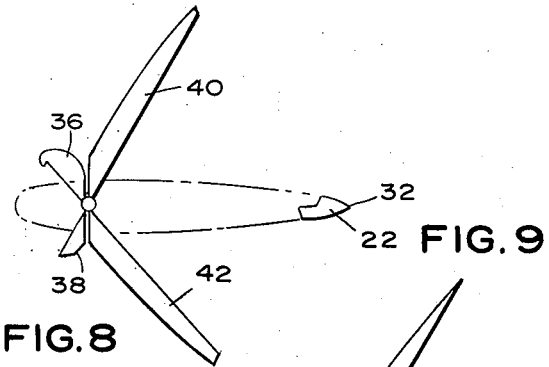
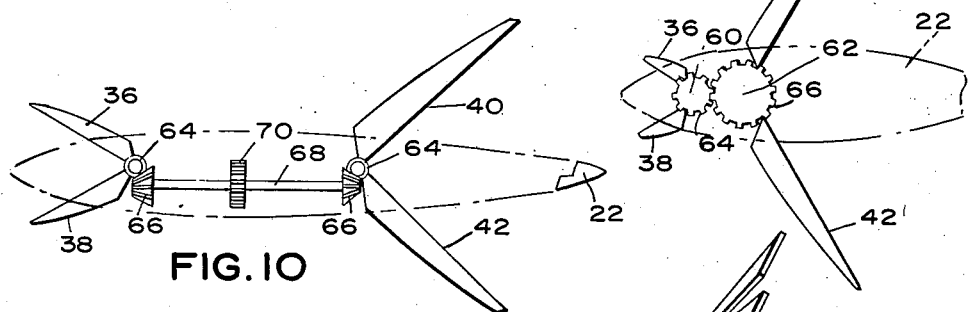
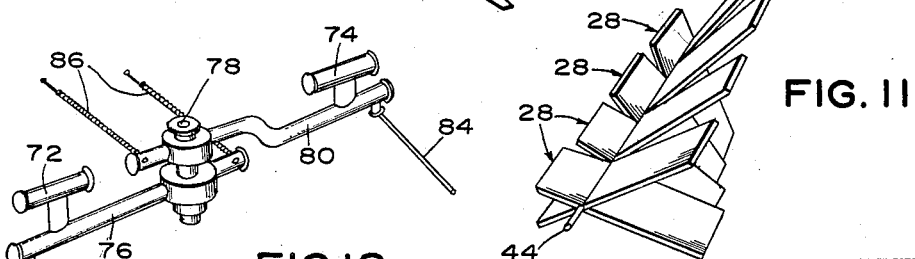
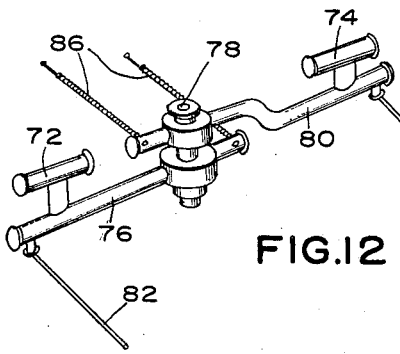
INVENTOR
SERGIO CACIAGLI
BY Raymond W. Cotton
ATTORNEY United States Patent Office 3,022,965
Patented Feb. 27, 1962

3,022,965
AIRCRAFT WING
Sergio Caciagli, Avenida Andres Bello Edificio V.A.M.
Torre Este, Apartamento 52, Caracas, Venezuela
Filed Nov. 24, 1958, Ser. No. 776,105
14 Claims. (Cl. 244—90)

This invention relates to aircraft wings provided near their tips with control devices having retracted positions in which they produce substantially no drag and extended positions in which they create substantial drag.

Where control devices of the type contemplated herein are employed, conventional rudders and vertical tail fins can be eliminated since the steering and stabilizing functions will be served without them. Moreover, the control devices contemplated by the present invention can be employed to produce a substantial braking effect whenever it is needed.

Conventional aircraft equipped with vertical tail fins and rudders cannot provide high maneuverability and stability simultaneously, but must sacrifice one for the other. By way of contrast, the present invention renders it possible to enjoy both stability and maneuverability at the same time. The control device according to the present invention is well suited for use with automatic pilots as well as manual operation.

When the control devices of the present invention are simultaneously extended on both wings of the aircraft, they serve as brakes to reduce the speed of the craft which is quite useful in a "nose down" and a sharp slant condition, in conjunction with "clean" aircraft, and in taxiing immediately after the wheels have engage the ground. It is among the object of this invention to provide an aircraft wing comprising a leading edge, a trailing edge, a tip, a control device comprising two sets of surfaces each pivoted about an axis extending spanwise of the wing and aft of the leading edge, the surfaces of one of the sets extending forwardly to the leading edge, the surfaces of the other of the sets extending rearwardly towards the trailing edge, and operating means connected with the surfaces for imparting pivotal movement thereto between retracted and extended positions relative to the wing.

A surface of one of the sets is preferably connected with a surface of the other of the sets and such connection may render such surfaces integral. Both surfaces of one of the sets are preferably connected with both surfaces respectively of the other of the sets. All of the surfaces may be pivoted about a single axis. The surfaces are preferably pivoted in substantially statically balanced relationship. The surfaces have retracted positions which are preferably substantially flush with the surfaces of the wing and the surfaces are preferably disposed inboard with respect to the wing tip.

A plurality of the control devices may be disposed along each wing and the operating means may impart dissimilar motions to the devices respectively. The surfaces of the sets may be pivoted about different axes, and the surfaces of one of the sets may be connected by gearing to the surfaces of the other of the sets. Where the surfaces of the sets are pivoted about different axes, they may be operated at dissimilar rates. The surfaces of the set extending rearwardly towards the trailing edge of the wing may terminate in spaced relationship to that edge.

A more complete understanding of the invention will follow from a description of the accompanying drawings wherein:

FIG. 5 is a fragmentary perspective view depicting a portion of a control device in extended condition;

FIG. 6 is a somewhat schematic cross section of a control device according to the present invention;

FIG. 7 is a fragmentary perspective view of a modified form of control device according to the present invention;

FIG. 8 is a somewhat schematic cross sectional view of a control device in extended condition relative to its wing;

FIG. 9 is a somewhat schematic cross section of a modified form of control device with respect to its wing;

FIG. 10 is a somewhat schematic cross section of a further modified form of control device relative to its wing;

FIG. 11 is a somewhat schematic perspective view depicting the arrangement of a plurality of control devices as they would be arranged along a wing; and FIG. 12 is a fragmentary perspective view depicting operating means for control devices of the types contemplated herein.

Figure 1:
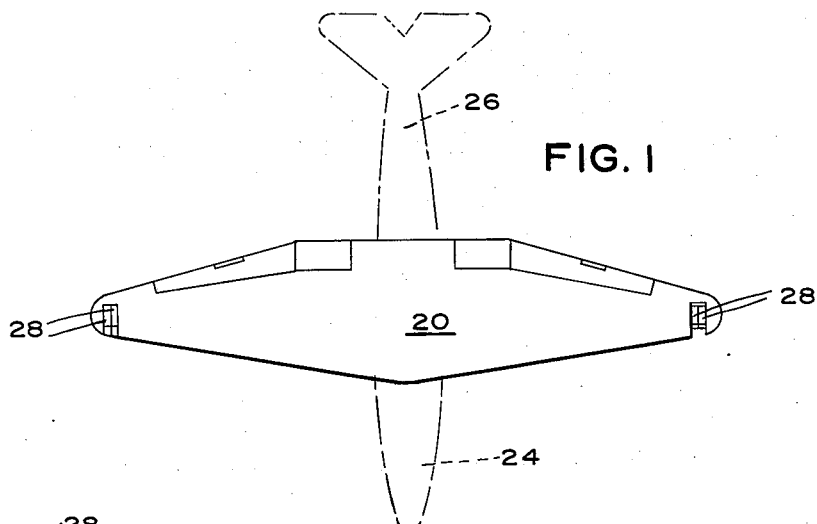
FIG. 1 is a plan view of an airplane equipped with control devices according to the present invention.
Figure 2:
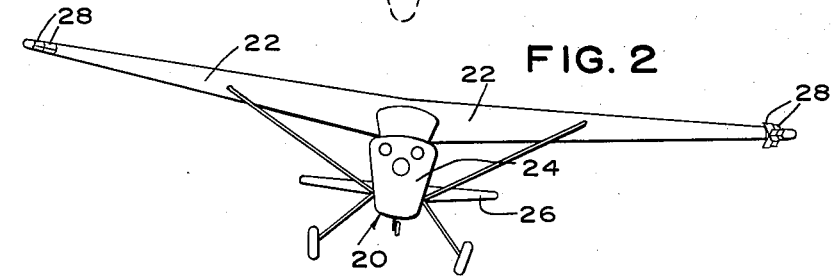
FIG. 2 is a front elevation of the airplane in FIG. 1 in a banking attitude.

The airplane 20 depicted in FIGS. 1 and 2 comprises wings 22, and as depicted in broken lines, a nose 24 and a tail 26. Each wing is provided with control devices 28, those depicted at the left of the figures being in retracted condition while those depicted at the right are in extended condition. Since the control devices at the right are extended, they reduce lift and provide drag, for which reasons the airplane as shown in FIG. 2 assumes a banked attitude.

Figure 3:
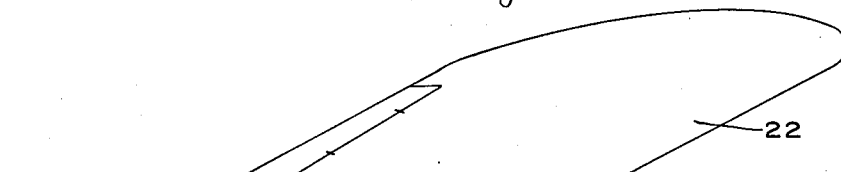
FIG. 3 is a perspective view on an enlarged scale of a wing equipped with control devices according to the present invention.
Figure 4:
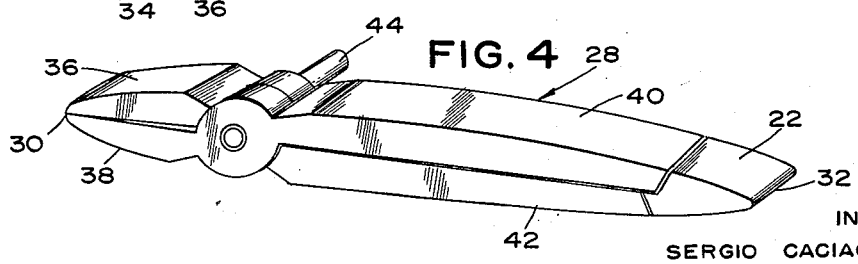
FIG. 4 is a fragmentary perspective view on a further enlarged scale depicting a portion of a control device in retracted condition.

One of the wings is depicted on an enlarged scale in FIG. 3 from which it will be apparent that the control devices 28 extend forwardly to the leading edge 30 of the wing and rearwardly towards the trailing edge 32 while being spaced somewhat inboard with respect to the wing tip 34. Thus, the control devices will not interfere with the use of auxiliary tanks or lights of the types customarily carried by the wing tips. The fragmentary showing of one of the control devices in FIG. 4 in retracted condition, and in FIG. 5 in extended condition, renders it clear that each device resembles a pair of tongs. Each device is provided with two sets of surfaces, one set including an upward forward surface 36 and a lower forward surface 38, the other set including an upper aft surface 40 and a lower aft surface 42. The forward surfaces 36 and 38 extend from the axis of their pivot 44 to terminate in line with the leading edge of the wing. The aft surfaces 40 and 42 extend rearwardly from the axis of their pivot 44 towards the trailing edge 32 of the wing 22. As will be clear from FIGS. 4 and 5, the upper forward surface 36 and the lower aft surface 42 are integral and the lower forward surface 38 is integral with the upper aft surface 40. Under retracted conditions as shown in FIGS. 3 and 4, the surfaces are substantially flush with the wing surfaces. Under extended conditions as depicted in FIG. 5, each of the surfaces will project beyond the wing surfaces to produce the desired effects. One form of operating mechanism has been depicted in FIG. 5 wherein stiff links 46 are joined to the proximate sides of the aft surfaces 40 and 42 by means of pivots 48, and these links 46 are connected by means of a pivot 50 with a push-pull rod or cable 52 actuated by an automatic pilot or manually as may be desired. The proximate sides of the aft surfaces 40 and 42 are shown as containing grooves 54 to receive the links 46 when the device assumes its retracted position.

While the control devices are preferably statically balanced, they are preferably pivoted more proximate to their leading edges than to their trailing edges so as to produce desired force relationships in the air streams to which they are exposed. The directions of these forces have been depicted somewhat schematically by the arrows 56 applied to FIG. 6. The form of the invention depicted in FIG. 7 is comparable with that of the preceding figures, and in addition, the surfaces have been provided with perforations of any desired shape to produce a desired degree of drag. The perforations 58 have been shown in each of the four surfaces.

The control device depicted in FIG. 8 assumes a fully extended position in which it will produce its maximum braking effect. In the modified form depicted in FIG. 9, the forward surfaces 36 and 38 are moved about a forward pivot 60 while the aft surfaces 40 and 42 are moved about an aft pivot 62, movement of the two sets of surfaces being synchronized through a forward gear 64 in mesh with an aft gear 66.

Another modification depicted in FIG. 10 contemplates the forward surfaces as movable about a forward pivot 60 and the aft surfaces movable about an aft pivot 62, each pivot carrying a bevel gear 64 in engagement with bevel gears 66 carried by a shaft 68 which is driven through a gear 70 by a suitable operating mechanism not shown.

FIG. 11 depicts the manner in which a larger number of such control devices will be arranged along a wing. By the relative positions of the surfaces of the several devices, it will be apparent that they are opened and closed at different rates in order to produce a smooth transition. Whereas the angular displacement of the forward and aft surfaces of each of the control devices is the same in FIG. 11, reverting to FIGS. 9 and 10, it will be apparent that the degree of opening of the forward surfaces can be different than that of the aft surfaces.

One form of operating mechanism has been depicted in FIG. 12 wherein pedals 72 and 74 are provided for the left and right feet respectively, of a pilot, the left pedal being carried by a bar 76 movable about a pivot 78, while the right pedal 74 is carried by a bar 80 also movable about the vertical pivot 78. The bar 76 operates a cable 82 for operating one or more control devices carried by the left wing of an airplane and similarly, the bar 80 is provided with a cable 84 for operating one or more control devices carried by the right wing of the airplane. With the bars 76 and 78 in the positions shown in FIG. 12, the control devices will assume their retracted positions. By pushing forwardly on the pedal 72 or 74, or both, their respective control devices will be extended to produce the desired effects. The bars 76 and 80 are biased towards their rest positions shown in FIG. 12 by means of springs 86 each of which has one end connected to one of the bars and its other end to a fixed portion of the fuselage, not shown.

By virtue of the substantially symmetrical arrangement of the surfaces of the control device of the present invention, when extended at a particular angle, they produce a drag involving substantially no vertical components and present a forward surface which is substantially constant for all angles of attack experienced under normal flight conditions. For similar reasons the drag coefficient will not vary appreciably.

In view of the constructions contemplated herein, aerodynamic compensation will be established between the forward and aft sets of surfaces so that the force necessary to extend them need be only sufficient to overcome the difference in drag between the forward and aft sets.

Actuation of the control devices may be achieved through the use of cables as will be suggested by the disclosures of FIGS. 5 and 12, or the forces can be transmitted manually or automatically by pneumatic, hydraulic or electrical systems of any desired type.

Whereas the pivots of the control devices may be supported by the wings in various ways, in the case of a two-spar wing, the axis of rotation may conveniently assume the form of an extension of the forward spar.

Assuming that an airplane is equipped with control devices conforming to the present invention, when the pilot wants to execute a right turn, he will push the right pedal forward in precisely the manner currently employed with a conventional rudder, causing the control devices carried by the right wing to be extended. The resulting aerodynamic reaction produces a moment causing rotation of the aircraft about its vertical axis. In addition to the drag produced by extending the surfaces of the control device, a loss of lift will be experienced to produce an automatic banking effect simultaneously with the turning which is of course, a natural and highly desirable result.

Under conditions of large angles of attack such as are encountered under landing conditions, the effectiveness of the control device of the present invention is not diminished in anywhere near the same proportions as would be the case with a conventional rudder. Moreover, the control devices of the present invention will never lie in an aerodynamic shadow as frequently occurs with conventional rudders.

Thus, as compared with the conventional vertical tail fin and rudder arrangement, the present invention permits a vast aerodynamic improvement, a decided reduction in weight, substantial reduction of dimensions, highly improved military operation from the standpoints of both offense and defense, and many other advantages.

As shown in FIG. 8 of the drawings, for example, the upper forward surface 36 may be somewhat longer than the lower forward surface 38, and the upper aft surface 40 may be somewhat longer than the lower aft surface 42. Such differences in areas of the surfaces are desirable to reduce vertical components as much as possible when the surfaces are extended.

When an aircraft is equipped with an automatic pilot or a stabilized gyroscope in conjunction with control devices conforming to the present invention (instead of a conventional tail fin and rudder), automatic stabilization of the aircraft about its vertical axis is assured.

Whereas only a limited number of embodiments of the present invention have been described with respect to the accompanying drawings, such modifications as will be suggested to those skilled in the art are contemplated by the appended claims.

I claim:

1. An aircraft wing comprising a leading edge, a trailing edge, a tip, a control device comprising two sets of surfaces each pivoted about an axis extending spanwise of said wing and aft of said leading edge, said surfaces of one of said sets being relatively movable and extending forwardly to said leading edge, said surfaces of the other of said sets being relatively movable and extending rearwardly towards said trailing edge, and positive adjusting means connected with said surfaces for imparting pivotal movement thereto between retracted and extended positions relative to said wing.

2. An aircraft wing as set forth in claim 1 wherein a surface of one of said sets is connected with a surface of the other of said sets.

3. An aircraft wing as set forth in claim 1 wherein a surface of one of said sets is integral with a surface of the other of said sets.

4. An aircraft wing as set forth in claim 1 wherein the surfaces of one of said sets are connected with the surfaces of the other of said sets respectively.

5. An aircraft wing as set forth in claim 1 wherein all of said surfaces are pivoted about a single axis.

6. An aircraft wing as set forth in claim 1 wherein said surfaces are pivoted in substantially balanced relationship.

7. An aircraft wing as set forth in claim 1 wherein said surfaces have retracted positions substantially flush with the surfaces of said wing.

8. An aircraft wing as set forth in claim 1 wherein said surfaces are disposed inboard of said tip.

9. An aircraft wing as set forth in claim 1 wherein a plurality of said devices are disposed along said wing.

10. An aircraft wing as set forth in claim 9 wherein said adjusting means imparts dissimilar movement to said devices respectively.

11. An aircraft wing as set forth in claim 1 wherein the surfaces of said sets are pivoted about different axes.

12. An aircraft wing as set forth in claim 11 wherein the surfaces of one of said sets are connected by gearing to the surfaces of the other of said sets.

13. An aircraft wing as set forth in claim 11 wherein the surfaces of said sets are operated at dissimilar rates.

14. An aircraft wing as set forth in claim 1 wherein the surfaces of said other set terminate in spaced relationship to said trailing edge.

References Cited in the file of this patent

UNITED STATES PATENTS

| 2,538,224 | Zuck | Jan. 16, 1951 |

FOREIGN PATENTS

| 402,645 | Great Britain | Dec. 7, 1933 |
| 581,876 | Great Britain | Oct. 28, 1946 |